United States Patent Office 3,075,024
Patented Jan. 22, 1963

3,075,024
SELECTIVE HYDROGENATION OF ACETYLENE IN ETHYLENE
Ludo K. Frevel, Midland, and Leonard J. Kressley, Saginaw, Mich., assignors to The Dow Chemical Company, Midland, Mich., a corporation of Delaware
No Drawing. Filed Aug. 31, 1959, Ser. No. 836,892
12 Claims. (Cl. 260—677)

This invention relates to selective hydrogenation of acetylene in the presence of ethylene. It pertains especially to an improvement in hydrogenation of a mixture comprising acetylene using a palladium catalyst whereby the hydrogenation of the ethylene is inhibited by the mixture of a thioether prior to contacting the mixture with the catalyst.

Ethylene is commonly produced by the pyrolysis of hydrocarbonaceous materials. Ethylene so produced usually contains at least a small proportion of acetylene. For many purposes for which ethylene is used, the presence of acetylene is undesirable and steps must be taken to remove it.

It is known that acetylene can be hydrogenated and procedures have been described for the selective hydrogenation of acetylene in an acetylene-ethylene mixture by the use of a palladium catalyst. Relatively good results in selective hydrogenation are obtained with a palladium catalyst, but substantial proportions of the acetylene may not be hydrogenated without either converting some of the acetylene to ethane or also hydrogenating a part of the initial ethylene in the mixture. While the amount of the acetylene and ethylene converted to ethane is decreased by the use of an improved palladium catalyst, such as described in the United States Letters Patent No. 2,802,889, issued to applicants of the instant application, it is desired to further enhance the hydrogenation of the acetylene so that the acetylene in the mixture can be substantially hydrogenated without the conversion of either the acetylene or the ethylene in the mixture to ethane.

Hydrogen sulfide and mercaptans have been added to gas mixtures to decrease the activity of catalysts containing nickel by partially poisoning the catalyst. In this manner, the activity of the catalyst is decreased to the point that acetylene is not completely hydrogenated. In addition to not completely hydrogenating the acetylene present, the activity of the catalyst is decreased by the sulfur reacting with the catalyst to form the sulfide so that it is necessary in relatively short time to regenerate the catalyst to move the sulfide.

It is among the objects of the present invention to provide an improved process for the selective hydrogenation of acetylene in a mixture containing acetylene and ethylene. A further object is to provide an improved process for the selective hydrogenation of acetylene employing a palladium catalyst whereby the hydrogenation of the acetylene is enhanced and the hydrogenation of the ethylene inhibited without permanently decreasing the activity of the catalyst.

The above and other objetcts are attained according to the invention, by intermixing a thioether with the acetylene and ethylene mixture in proportions of from .0005 to 30 volume percent prior to contacting the mixture with the palladium catalyst. The presence of the thioether in the mixture facilitates the hydrogenation of the acetylene to ethylene while inhibiting the hydrogenation of the ethylene. The thioether placed in the acetylene-ethylene mixture does not react with the catalyst, it passes through the catalyst bed apparently unchanged. Since the thioether added to the mixture does not react with the catalyst, it is not retained by the catalyst and does not have any permanent effect.

The thioethers which are effective are the dialkyl sulfides having alkyl radicals containing from 1 to 5 carbon atoms as well as cyclic thioethers having up to 5 carbon atoms in the ring. Illustrative examples of the thioethers which may be used are dimethyl sulfide, diethyl sulfide, ethyl butyl sulfide, dibutyl sulfide and diamyl sulfide. Thiophene, tetramethylene sulfide and pentamethylene sulfide are illustrative examples of the cyclic thioethers which are effective.

Under controlled conditions, it is possible to form the thioethers in situ. When a sulfur-containing compound such as hydrogen sulfide and carbonyl sulfide in a hydrocarbon mixture is subjected to a palladium catalyst at temperatures below 110° C., the sulfur-containing compound is converted to a thioether. Thus, using a temperature below 110° C. and a hydrocarbon stream containing from about 10 to not more than 100 parts per million of hydrogen sulfide or carbonyl sulfide, it is possible to form the thioether in situ and thus enhance the selectivity of the catalyst. At higher concentrations of the sulfur-containing compound or when temperatures above 110° C. are used the rate of the conversion of the sulfur-containing compound to the thioether is not great enough to prevent some reaction of the sulfur with the catalyst and a gradual poisoning of the catalyst is obtained. With the use of the thioether, this difficulty is not encountered.

While the amount of the thioether intermixed with the acetylene-ethylene mixture may be as high as 30 volume percent, an amount exceeding 0.02 volume percent (200 parts by volume of the thioether per million parts of the acetylene-ethylene mixture) is very seldom used. No apparent beneficial advantage is gained by using larger amounts. It is generally preferred to have from 0.004 to 0.01 volume percent of the thioether in the feed mixture, although as little as 0.0005 volume percent (5 parts per million of the thioether in the gas mixture) markedly improves or enhances the hydrogenation of the acetylene.

The presence of the thioether not only improves the selectivity of the known palladium hydrogenation catalysts, but it further improves the selectivity of palladium catalysts to which other metals have been added to improve the catalyst's selectivity. For example, the selectivity of palladium catalyst which may consist of from 1 to 40 parts by weight per hundred parts of a metal, such as silver, copper, or gold, is further improved by the addition of the sulfur-containing compounds in the feed stream.

In practicing the present invention, a procedure similar to that used in contacting an acetylene and ethylene mixture with a palladium catalyst is used, except that a limited amount of the thioether is added prior to contacting the mixture with the catalyst. A gas stream of the ethylene, containing acetylene to be removed, is intermixed with a gas stream of hydrogen, unless an excess of hydrogen is already present in the ethylene-acetylene mixture, and generally from 40 to 100 parts by volume of the thioether per million parts of the mixture are added. The resulting mixture is passed into contact with the palladium catalyst whereby the acetylene is selectively hydrogenated to ethylene. The gas mixture may contain other materials, such as hydrocarbons, normally incident to the preparation of ethylene-containing gas, as well as nitrogen, carbon dioxide, and small portions of air and water vapor.

The proportion of hydrogen which should be present in, or be added to, the ethylene gas is at least that proportion necessary to hydrogenate all of the acetylene present in the mixture, i.e., 1 mole or more of hydrogen per mole of acetylene. A slight excess of hydrogen over that theoretically necessary to react with all the acetylene is usually required in the practical operation. Usually it is preferred to employ the minimum proportion of hydrogen that satisfactorily removes the acetylene from the treated gas product.

The reaction temperature used in the hydrogenation is generally maintained below 110° C. At temperatures above 110° C., some sulfurization of the catalyst may be obtained with particular thioethers at high concentration. The reaction rate obtained with most palladium catalysts is sufficiently rapid so that a higher reaction temperature is not necessary. For some catalysts room temperature or temperatures up to only 60° C. may be desired.

The pressure of the gas in the hydrogenation reaction zone does not appear to be critical and can be above or below atmospheric pressure.

The following examples further illustrate the invention but are not to be construed as limiting it thereto.

EXAMPLE I

A palladium catalyst containing 0.2 weight percent palladium and 0.002 weight percent silver prepared in a manner similar to that described in U.S. Patent No. 2,802,889, was used in the selective hydrogenation of a mixture containing acetylene and ethylene. The catalyst, in an amount of 15 milliliters, was placed in a glass reactor tube 10 centimeters long having an internal diameter of 1.2 centimeters and heated by a cylindrical electrical heater surrounding the tube.

A synthetic mixture of gases was made up from separate ingredients by metering separate streams of ethylene, acetylene, and hydrogen taken from storage cylinders through orifice meters under constant pressures maintained by constant-head bubbling column in each line. The acetylene stream was passed through a charcoal absorber to remove acetone and through a chromic acid scrubber to remove any phosphines or arsines. The three separated gas streams were brought together and mixed, and the resulting mixture was passed through a bed of basic lead acetate to remove any sulfides. To the so-treated stream, a given amount of dimethyl sulfide was then intermixed. In this manner, a stream of ethylene containing 4 percent acetylene, 6 percent hydrogen, and 5 p.p.m. by volume of dimethyl sulfide was thus obtained. This stream was passed over the 15 milliliters of the catalyst at a rate of 300 to 330 milliliters per minute while the catalyst was maintained at a temperature of 80° C.

The product stream issuing from the reactor was analyzed by a mass spectrometer for ethane formation. No acetylene could be detected by the most sensitive colorimetric test for acetylene.

The above run was repeated a number of times where the amount of dimethyl sulfide in the gas stream was increased up to 16.5 volume percent of the acetylene-ethylene test stream. In all of the tests made, acetylene could not be detected in the product stream leaving the reactor. When 16.5 volume percent of dimethyl sulfide was used, the product had the following analysis in volume percent:

| | Volume percent |
|---|---|
| Hydrogen | 1.9 |
| Methane | 0.2 |
| Ethylene | 80.0 |
| Ethane | 0.4 |
| Propylene | 0.3 |
| Butene | 0.6 |
| Dimethyl sulfide | 16.5 |
| Higher hydrocarbons | 0.7 |

EXAMPLE II

In a manner similar to that described above, a stream of ethylene containing in volume percent 4 percent acetylene, and 5 percent hydrogen was hydrogenated. The stream was passed through the 15 millimeters of catalyst at a temperature in the range of 70° C. When no diethyl sulfide was added, approximately 10 parts per million of acetylene was obtained in the effluent leaving the reactor. Upon addition of diethyl sulfide in an amount of 30 parts of diethyl sulfide per milion parts of the ethylene gas stream mixture, approximately 1 part per million of acetylene was detected in the product stream about 8 minutes after the diethyl sulfide stream was first introduced. After 10 minutes no more acetylene could be detected. When the diethyl sulfide was turned off and no more was added to the ethylene gas stream, acetylene was immediately detected in the product stream and shortly increased to about 10 parts per million again. When the diethyl sulfide was again added to the stream in amount of 30 parts per million, the acetylene in the product stream decreased until it could no longer be detected in about 5 minutes.

In a manner similar to that described above, diisobutyl sulfide, ethyl n-butyl sulfide and thiophene were used in place of diethyl sulfide and similar results obtained.

EXAMPLE III

In a manner similar to that described in Example I, a stream of ethylene containing in volume percent 4 percent acetylene, 5.3 percent hydrogen, and 100 parts of hydrogen sulfide per million parts of the ethylene mixture was passed through 15 ml. of the catalyst at a temperature of from 94° to 107° C.

The hydrogen sulfide was converted to diethyl sulfide upon contact with the catalyst and was present as such in the discharge product. No acetylene could be detected in the product.

After 24 hours of operation the introduction of hydrogen sulfide was discontinued. Shortly after discontinuing the introduction of the hydrogen sulfide, the product issuing from the catalyst bed contained from 10 to 25 parts of acetylene per million parts of the effluent. When the hydrogen sulfide was replaced in the stream in the amount of 1000 parts per million parts of the ethylene mixture, no acetylene could be detected for a period of several minutes. After 15 minutes, acetylene was detected and the amount of acetylene gradually increased to about 1 volume percent in 4 minutes. Diethyl sulfide was present in the product at all times.

Similar results were obtained when carbonyl sulfide was used in place of hydrogen sulfide.

This application is a continuation-in-part of an earlier filed application Serial No. 765,327 filed October 6, 1958, now abandoned.

What is claimed is:

1. In a process for the selective hydrogenation of acetylene in a mixture containing ethylene and acetylene wherein the mixture with hydrogen in a proportion greater than 1 mole of hydrogen per mole of acetylene is contacted with a palladium catalyst, the improvement of enhancing the hydrogenation of the acetylene and inhibiting the hydrogenation of ethylene which comprises the step of intermixing the mixture with from .0005 to 30 volume percent of a thioether selected from the group consisting of dialkyl sulfide having alkyl radicals containing from 1 to 5 carbon atoms and cyclic thioether having up to 5 carbon atoms before contacting the mixture with the palladium catalyst at a temperature less than 110° C.

2. A process according to claim 1 wherein the thioether is a dialkyl sulfide having alkyl radicals containing from 1 to 5 carbon atoms, and is intermixed with the mixture in amount of from .004 to .01 volume percent.

3. A process for the selective hydrogenation of acetylene in a mixture containing acetylene and ethylene, which comprises intermixing the mixture with from .0005 to 30 volume percent of a thioether selected from the group consisting of dialkyl sulfide having alkyl radicals containing from 1 to 5 carbon atoms and cyclic thioethers having up to 5 carbon atoms, and with hydrogen in a proportion greater than 1 mole of hydrogen per mole of acetylene in the mixture, passing the resulting mixture in contact with a catalytic body containing an effective proportion of a composite metal material wherein are from 60 to 99 parts by weight of palladium and from 40 to 1 by weight of silver at a temperature less than 110° C.

4. A process according to claim 3 wherein the thioether is dimethyl sulfide.

5. A process according to claim 4 wherein the acetylene and ethylene is intermixed with from .004 to .01 volume percent dimethylsulfide.

6. A process according to claim 3 wherein the thioether is diethyl sulfide.

7. A process according to claim 4 wherein the acetylene and ethylene is intermixed with from .004 to .01 volume percent diethyl sulfide.

8. A process according to claim 3 wherein the thioether is ethyl n-butyl sulfide.

9. A process according to claim 3 wherein the thioether is diisoamyl sulfide.

10. A process according to claim 3 wherein the thioether is thiophene.

11. A process according to claim 10 wherein the acetylene and ethylene is intermixed with from .004 to .01 volume percent of thiophene.

12. In a process for the selective hydrogenation of acetylene in a mixture containing ethylene and acetylene wherein the mixture with hydrogen in a proportion greater than 1 mole of hydrogen per mole of acetylene is contacted with a palladium catalyst in a reactor at a temperature less than 110° C. in the presence of a thioether to enhance the hydrogenation of the acetylene and inhibit the hydrogenation of ethylene, the step of forming the thioether in the reactor which comprises intermixing the mixture with from 10 to 100 parts by volume of a sulfur compound selected from the group consisting of carbonyl sulfide and hydrogen sulfide per million parts by volume of the mixture before contacting the mixture with the palladium catalyst.

References Cited in the file of this patent

UNITED STATES PATENTS

| | | |
|---|---|---|
| 1,421,743 | Stuer et al. | July 4, 1922 |
| 2,359,759 | Hebbard et al. | Oct. 10, 1944 |
| 2,379,670 | Welling et al. | July 3, 1945 |
| 2,401,444 | Welling | June 4, 1946 |
| 2,402,493 | Greensfelder et al. | June 18, 1946 |
| 2,511,453 | Barry | June 13, 1950 |
| 2,610,981 | Short | Sept. 16, 1952 |
| 2,802,889 | Frevel et al. | Aug. 13, 1957 |

OTHER REFERENCES

Berkman et al.: Catalysis, Reinhold Pub. Co., 1940, pages 822–823 relied on.

Bowen et al.: "Removal of Acetylene from Hydrocarbon Gases," Jour. Soc. Chem. Ind., vol. 69, pages 65–69, March 1950.